Figure 1:
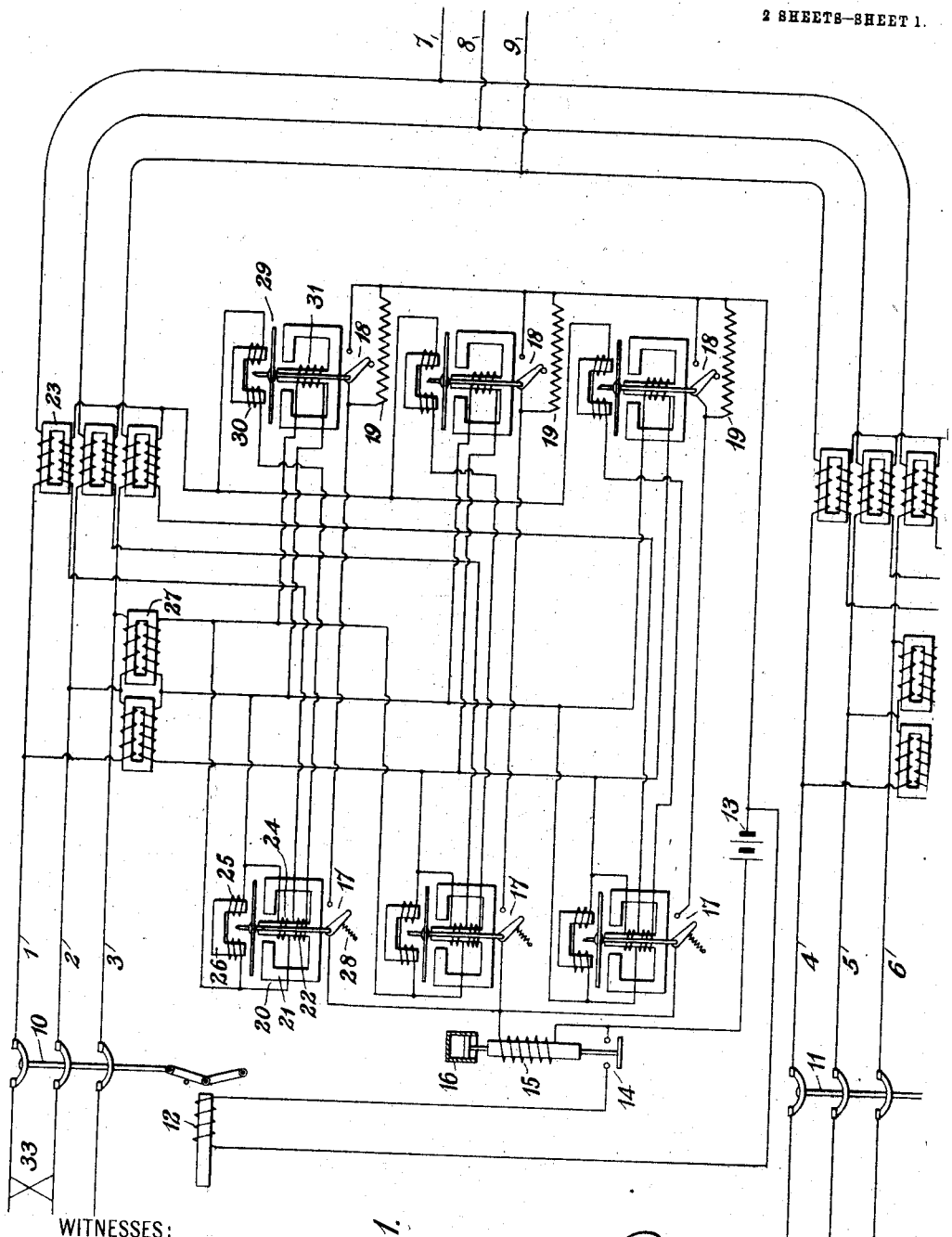

P. MacGAHAN.
PROTECTIVE DEVICE FOR ELECTRICAL CIRCUITS.
APPLICATION FILED JAN. 10, 1908.

977,649.

Patented Dec. 6, 1910.
2 SHEETS—SHEET 1.

WITNESSES:
C. L. Belcher
Otto J. Schairer

INVENTOR
Paul MacGahan
BY
Wesley G. Carr
ATTORNEY

P. MacGAHAN.
PROTECTIVE DEVICE FOR ELECTRICAL CIRCUITS.
APPLICATION FILED JAN. 10, 1908.

977,649.

Patented Dec. 6, 1910.
2 SHEETS—SHEET 2.

WITNESSES:
C. L. Belcher
Otto S. Schairer

INVENTOR
Paul MacGahan
BY
Wesley G. Carr
ATTORNEY

UNITED STATES PATENT OFFICE.

PAUL MacGAHAN, OF WILKINSBURG, PENNSYLVANIA, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

PROTECTIVE DEVICE FOR ELECTRICAL CIRCUITS.

977,649.    Specification of Letters Patent.    Patented Dec. 6, 1910.

Application filed January 10, 1908. Serial No. 410,218.

*To all whom it may concern:*

Be it known that I, PAUL MACGAHAN, a citizen of the United States, and a resident of Wilkinsburg, in the county of Allegheny and State of Pennsylvania, have invented a new and useful Improvement in Protective Devices for Electrical Circuits, of which the following is a specification.

My invention relates to protective devices for electrical distributing systems, and particularly to such devices as are adapted to protect systems, comprising parallel transmission lines, from injuries that might result from overloads or from reversals of the flow of energy therein.

The object of my invention is to provide a system of the character indicated in which an injured line will become disconnected from the remainder of the system more promptly when it is traversed by energy in the reverse of normal direction than when traversed by an abnormal amount of energy in the normal direction.

In order to insure the maintenance and reliability of the service rendered by electrical systems, it is a common expedient to employ parallel transmission lines, and it has heretofore been sought to so protect a system of this character that, upon the occurrence of an injury to one line it would become automatically disconnected from the remainder of the system without disturbing the other line. This result has been accomplished, only imperfectly however, because, even though, upon the occurrence of a short-circuit or ground upon one line, current will traverse a portion of that line in the reverse of normal direction, an abnormal amount of energy may, at the same time, and due to the same cause, traverse the other line in the normal direction and thus cause the circuit-breakers therein to open as promptly as those in the injured line. For instance, let us consider the most common system of protection heretofore in practical use, in which ordinary overload relays are associated with circuit-breakers in each transmission line at the power house, and in which means are provided at each sub-station, for opening circuit-breakers in each line, either upon the occurrence of an overload, or upon reversal of the flow of energy in the line.

One device which has heretofore been provided for installation at the sub-station end of parallel transmission lines constitutes the subject-matter of an application, Serial No. 259,388, filed May 8, 1905, by Frank Conrad, and assigned to the Westinghouse Electric & Manufacturing Company, the said device being actuated by the algebraic sum of forces respectively proportional to the amount of energy and the square of the amount of current traversing the circuit. If the current traversing a circuit in connection with which the said device is employed exceeds a predetermined amount, the torque that is dependent upon the current alone may exceed that which is dependent upon the product of current, voltage and power factor (which may at times be small on account of the decrease in voltage and power factor) by such an amount as to effect operation of the device and cause the circuit-breaker to open. If, for any reason, the direction of the drop of potential in the circuit becomes reversed, the two torques act in the same direction, and, if the total torque exceeds a predetermined amount, the device will operate and cause the circuit-breaker to open. While the said device supplied the demand for a relay that should operate when the amount of current taken from a system becomes so large as to cause a very material reduction in the voltage, and while it may also be so arranged that it will operate to cause opening of the circuit-breakers when the circuit is traversed by a smaller amount of energy in the reverse of normal direction than in the normal direction, when short-circuits or low resistance grounds occur near a sub-station and cause very low voltage at the sub-station, the device associated with an uninjured line may operate by reason of an overload therein substantially simultaneously with the operation of the device associated with the injured line, which operates owing to a reversal of the flow of energy. Thus, not only the disabled line, but the uninjured line as well, may become disconnected from the remainder of the system.

According to the present invention, the circuit-breakers are caused to open more promptly when the circuit is traversed by energy in the reverse of normal direction than when an abnormal amount of current persists in a line for a predetermined length of time. To this end, the present system provides two switches for governing the operation of the circuit-breakers in each line, both switches being closed only when energy traverses the circuit in the reverse of normal direction. One switch is operated by means of the above-mentioned device invented by Frank Conrad, and the other switch is operated by means of a wattmeter device.

To effect operation of the circuit-breakers when the current traversing the circuit exceeds a predetermined amount, a third switch that is connected in shunt to the aforesaid switches is closed by means of a time limit overload device. Thus, by the present arrangement, if a ground or short-circuit occurs upon one of the lines near a sub-station, the circuit-breakers at the sub-station, in the disabled line, will be operated because of the reversal of the flow of energy in that line, while the overload in the uninjured line resulting from the injury to the other line will not cause the circuit-breakers in the uninjured line to open, unless the overload conditions persist for a predetermined length of time.

Figure 2:
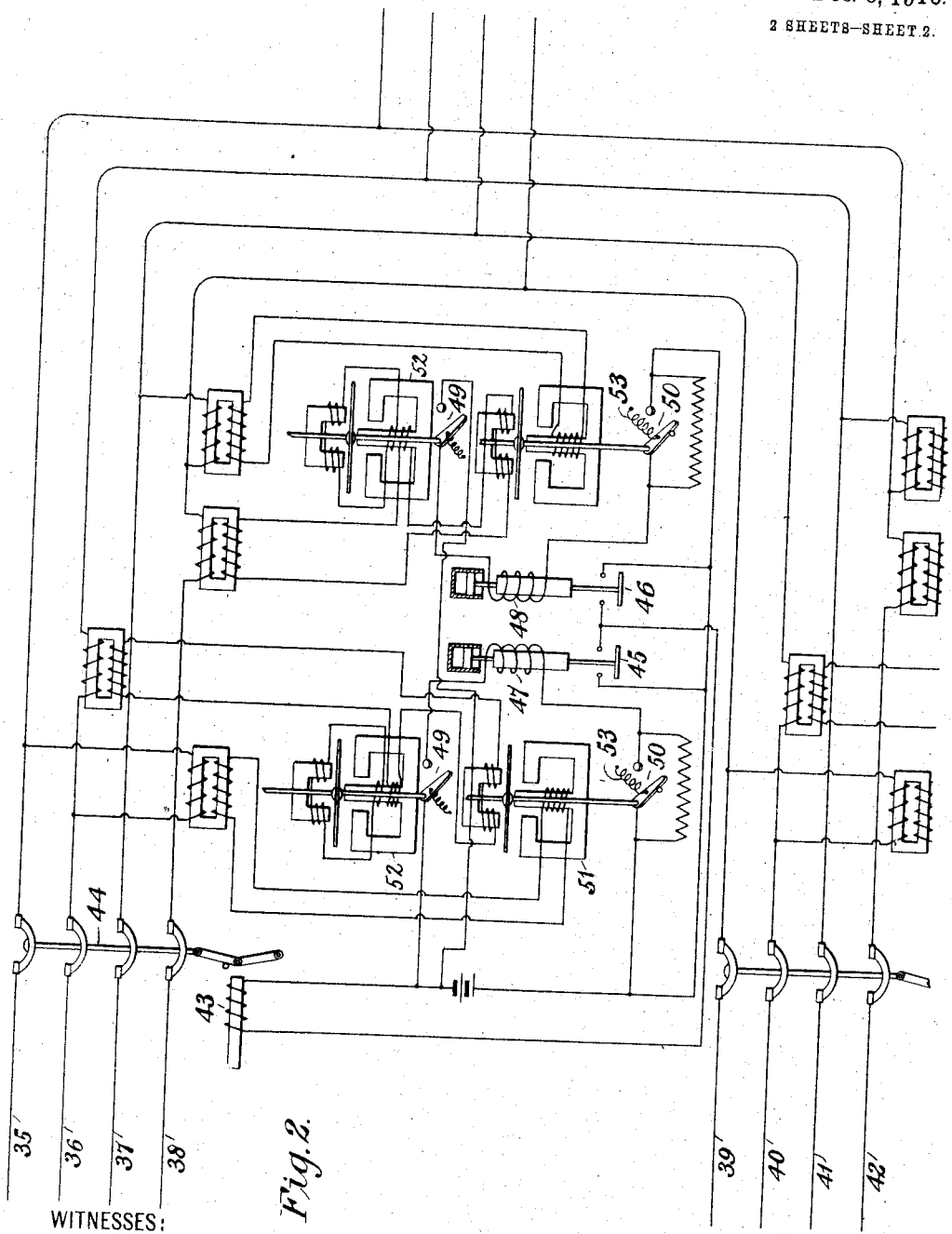

The accompanying drawings illustrate diagrammatically systems embodying my invention, that of Figure 1 being a three-phase system and that of Fig. 2 a two-phase system.

The system of Fig. 1 comprises two parallel transmission lines 1—2—3 and 4—5—6 that feed, at a sub-station, a suitable distributing circuit 7—8—9, multiple-pole circuit-breakers 10 and 11 being interposed respectively in the transmission lines at the sub-station. Each transmission line is protected by a similar system of relays, and it has heretofore been deemed necessary to illustrate and describe completely only the system employed in connection with one of the lines. The circuit-breaker 10 is actuated by an electro-magnetic device comprising a magnet winding 12, the circuit of which includes a battery 13 or any other suitable source of current and is controlled by means of a switch 14 having an operating or controlling magnet winding 15, the switch being provided with a dash-pot 16 or other suitable means for retarding its operation in such a manner that the period of time which must elapse before the switch will be closed will vary substantially inversely as the amount of current traversing the operating magnet winding 15. The circuit of the magnet winding 15 is governed by means of three pairs of similar switches 17 and 18 that are disposed in parallel circuits, resistances 19 being connected in shunt to the switches 18. One pair of the switches 17 and 18 is provided for each phase of the distributing system and, since the circuit arrangements and the devices provided for each phase are substantially identical, they will be described with reference to only one of the phases. The switch 17 is operated by means of a device 20 constructed substantially like that set forth in Patent No. 853,218, granted May 14, 1907, to the Westinghouse Electric & Manufacturing Company, as assignee of William M. Bradshaw, except that the windings are so arranged that the principles set forth in the above-mentioned application of Frank Conrad may be utilized. The said instrument comprises a two-part magnetizable core, the core part 21 thereof being provided with a winding 22 the energizing current for which is proportional in amount to that traversing line conductor 1 and is supplied by a series transformer 23. The core part 21 is also provided with a winding 24 that is connected in closed circuit with a winding 25 upon core part 26 of the instrument, a voltage being impressed upon the winding 25, which is proportional to that of one phase of the transmission line 1—2—3, by means of a shunt transformer 27.

The device 20 is actuated, as before explained, by the algebraic sum of two torques, respectively proportional to the square of the current traversing the circuit and to the product of the current, voltage and power factor of the circuit, so that the switch 17 will be closed against the action of a spring 28, either when the amount of energy traversing the transmission line 1—2—3 exceeds a predetermined value, or when energy traverses the said line in the reverse of normal direction. The switch 18 is operated by means of a wattmeter device 29 constructed like that set forth in Patent No. 853,218, current being supplied to winding 30 thereof, which is proportional in amount to that which traverses line conductor 1, by means of a series transformer 23, and to winding 31 thereof, which is proportional in amount to the voltage of one phase of the transmission line 1—2—3, by means of the shunt transformer 27.

The instrument 29 serves to maintain the switch 18 open when energy traverses transmission line 1—2—3 in the normal direction, and to close the said switch when energy traverses the transmission line 1—2—3 in the reverse direction. Thus, it is seen that when an abnormal amount of current traverses the circuit 1—2—3 only switch 17 is closed. A circuit is then established for the magnet winding 15 to include the resistance 19, which so limits the amount of current that may traverse the winding 15 that the said winding will be energized only feebly and the switch 14 will be closed slowly, both for this reason and also on account of the retarding action of the dash-pot 16. The circuit-breaker 10 will not, therefore, be opened unless and until the abnormal amount of current has persisted in the circuit 1—2—3 a predetermined length of time. However, when current traverses the line 1—2—3 in the reverse of normal direction, the switches 17 and 18 are both closed, and a circuit is established for the winding 15 which does not include the resistance 19. The magnet winding 15 being, therefore, strongly energized, it promptly closes the switch 14, and the circuit-breaker 10 is, accordingly, immediately opened. Thus, upon occurrence of a short circuit or a low resistance ground upon the transmission line 1—2—3 near the sub-station as, for instance, at 33, energy will be supplied to the sub-station through the transmission line 4—5—6 and will traverse the line 1—2—3 toward the short-circuit at 33, the amount of energy, of course, being large on account of the short-circuit. The switches 17 and 18 will be closed immediately, on account of the reversal of the flow of energy in the line 1—2—3, and the circuit-breaker 10 will therefore be opened promptly, the disabled line being thereby disconnected from the sub-station. It will be understood that the said line will also be disconnected from the remainder of the system at the main station, in the usual manner by means of ordinary overload devices. Since the transmission line 4—5—6 is traversed by an abnormal amount of current, the switch 17 (not shown) associated therewith may be closed and the switch 14 associated therewith will begin to close, though it cannot close by the time the circuit-breaker 10 has been opened and the overload conditions upon the line 4—5—6 have been thereby relieved.

In the system of Fig. 2, the invention is shown as employed in connection with a two-phase system comprising parallel transmission lines 35—36—37—38 and 39—40—41—42, the circuit of a controlling magnet winding 43 for a circuit-breaker 44 in the transmission line 35—36—37—38, being governed by two time limit relay switches 45 and 46, one for each phase of the system. The circuits of magnet windings 47 and 48 of the switches 45 and 46, respectively, are governed by similar pairs of switches 49 and 50, the switch 50 being actuated by means of a wattmeter 51, and the switch 49 being actuated by means of an ammeter device 52 that operates in accordance with principles set forth in Patent No. 794,395 and being constructed substantially like the instrument 20 of Fig. 1. The system differs further from that of Fig. 1 in that the springs 53 are provided for normally exerting forces tending to close switches 50 in order to make sure that the said switches will be closed upon a reversal of the direction of the flow of energy in the system and to avoid relying upon comparatively small torques that may be exerted by the instruments 51 upon the occurrence of a low voltage caused by a short-circuit or ground upon the transmission line.

It will be readily understood that many modifications other than those which have been illustrated and described may be made in the system without altering its mode of operation or departing from the spirit of the invention and I desire that all such modifications shall be included within its scope.

I claim as my invention:

1. The combination with an electrical circuit, circuit-breakers therein, and actuating means for the circuit-breakers, of a switch for controlling the said actuating means, two other switches for controlling the aforesaid switch, a resistance in shunt to one of said other switches, means for closing the unshunted switch when the circuit is traversed by energy in the reverse of normal direction and by more than a predetermined amount of current, and means for holding the shunted switch open when the circuit is traversed by energy in the normal direction.

2. The combination with an electrical circuit, circuit-breakers therein, actuating means for the circuit-breakers, and a switch for controlling the said actuating means, two other switches for controlling the aforesaid switch, and a resistance shunting one of the switches, of means for closing the unshunted switch when the circuit is traversed by energy in the reverse of normal direction and by more than a predetermined amount of current, and means for maintaining the shunted switch open when the circuit is traversed by energy in the normal direction and for closing it when the circuit is traversed by energy in the reverse of normal direction.

3. The combination with an electrical circuit, a circuit-breaker therein, and actuating means for the circuit-breaker, and a switch for controlling the said actuating means and for controlling a magnet winding, of means for establishing a low-resistance circuit for the said magnet winding when the circuit is traversed by energy in the reverse of normal direction, and for establishing a high-resistance circuit therefor when the circuit is traversed by an abnormal amount of current.

In testimony whereof, I have hereunto subscribed my name this 23rd day of Dec., 1907.

PAUL MacGAHAN.

Witnesses:
 M. C. RYMINSTER,
 BIRNEY HINES.